3,658,885
WATER-INSOLUBLE DYES
Guenter Lange, Ludwigshafen (Rhine), and Wolfgang Fabian, Heidelberg, Germany, assignors to Badische Anilin- & Soda-Fabrik Aktiengesellschaft, Ludwigshafen (Rhine), Germany
No Drawing. Filed Sept. 29, 1967, Ser. No. 671,581
Claims priority, application Germany, Oct. 6, 1966,
P 15 69 662.5
Int. Cl. C07c 69/54, 69/34
U.S. Cl. 260—486 R            2 Claims

ABSTRACT OF THE DISCLOSURE

New valuable dyestuffs derived from N-[ω-acyloxyalkyl]-nitroanilines.

---

The invention relates to valuable new dyestuffs of the general Formula I:

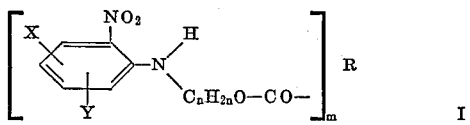

in which X and Y each denotes an alkyl group having 1 to 4 carbon atoms, an alkoxy group having 1 or 2 carbon atoms, a cyano group, a sulfonamide group, a N-substituted sulfonamide group, a carbonamide group, a N-substituted carbonamide group, an acylamino group, the acyl residue having 1 to 3 carbon atoms, a halogen atom or a hydrogen atom, $n$ denotes one of the integers 1 to 6, $m$ denotes one of the integers 1 and 2 and R denotes the residue of an aliphatic or aromatic mono- or dicarboxylic acid.

Specific examples of substituents are chlorine, bromine, methyl, ethyl, methoxy, ethoxy, phenoxy, N-methylsulfonamide, N-dimethylsulfonamide, N-ethylcarbonamide, N-dimethylcarbonamide, N-phenylcarbonamide, acetyl, acetylamino and dimethylamino.

The dyes having the Formula I are obtained by reacting compounds having the general Formula II:

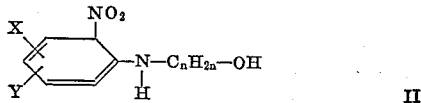

with an unsubstituted or substituted aliphatic or aromatic carboxylic acid having the general Formula III:

$$R(COOH)_m \qquad III$$

or their functional derivatives capable of forming esters with compounds having the Formula II, X, Y, R, $m$ and $n$ having the above meanings and no ionic water-solubilizing groups being introduced into the dyes having the Formula I by the components having the Formulae II and III.

Examples of amino alcohols having the Formula II are:
N-(2-nitrophenyl)-β-aminoethyl alcohol,
N-(4-methyl-2-nitrophenyl)-β-aminoethyl alcohol,
N-(4-acetylamino-2-nitrophenyl)-β-aminoethyl alcohol,
N-(4-dimethylamidosulfonyl-2-nitrophenyl)-β-aminoethyl alcohol,
N-(4-carbonamido-2-nitrophenyl)-β-aminoethyl alcohol,
N-(4-cyano-2-nitrophenyl)-β-aminoethyl alcohol,
N-(4-methoxy-2-nitrophenyl)-β-aminoethyl alcohol,
N-(4-chloro-2-nitrophenyl)-β-aminoethyl alcohol,
N-(5-chloro-2-nitrophenyl)-β-aminoethyl alcohol,
N-(4,5-dichloro-2-nitrophenyl)-β-aminoethyl alcohol,
N-(2-nitrophenyl-4-bromo)-β-aminoethyl alcohol,
N-(2-nitrophenyl)-γ-aminopropyl alcohol,
N-(4-chloro-2-nitrophenyl)-γ-aminopropyl alcohol and
N-(4,5-dichloro-2-nitrophenyl)-γ-aminopropyl alcohol.

Compound having the general Formula II may be prepared for example by reaction of o-nitroarylamines with alkylene oxides or haloalkyl alcohols or by reaction of o-nitrohaloaryl compounds with amino alcohols.

Examples of carboxylic acids having the Formula III are aliphatic and aromatic saturated and unsaturated monocarboxylic or dicarboxylic acids, which may bear substituents such as halogen atoms or alkyl groups, aryl groups, aryloxy groups, azo groups, ureido groups, hydroxyl groups, nitrile groups and nitro groups.

The following are specific examples of carboxylic acids: acetic acid, propionic acid, butyric acid, isobutyric acid, isovaleric acid, n-valeric acid, β-chloropropionic acid, methoxypropionic acid, phenoxyacetic acid, acrylic acid, methacrylic acid, cinnamic acid, benzoic acid, meta-nitrobenzoic acid, para-nitrobenzoic acid, meta-methoxybenzoic acid, para-methoxybenzoic acid, ortho-chlorobenzoic acid, para-chlorobenzoic acid, salicylic acid, 2,3-hydroxynaphthoic acid, oxalic acid, malonic acid, succinic acid, bromosuccinic acid, adipic acid, methyladipic acid, fumaric acid, muconic acid, terephthalic acid, dichloroterephthalic acid, 4,4'-azobenzene dicarboxylic acid, 4,4'-stilbene dicarboxylic acid, isophthalic acid, chloroisophthalic acid and 2,6-naphthalene dicarboxylic acid and also a mixture of isomeric $C_8$-carboxylic acids.

Dyes having particular industrial importance have the formula:

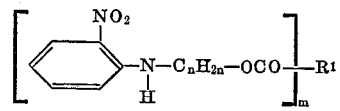

in which $m$ and $n$ have the meanings given above and $R^1$ denotes the residue of acetic acid, propionic acid, butyric acid, isobutyric acid, n-valeric acid, isovaleric acid, chloroacetic acid, β-chloropropionic acid, β-methoxypropionic acid, phenoxyacetic acid, acrylic acid, methacrylic acid, cinnamic acid, benzoic acid, orthonitrobenzoic acid, meta-nitrobenzoic acid, para-nitrobenzoic acid, malonic acid, succinic acid, bromosuccinic acid, adipic acid, 2-methyladipic acid, 3-methyladipic acid, fumaric acid, muconic acid, terephthalic acid, dichloroterephthalic acids, isophthalic acids, chloroisophthalic acids, 4,4'-azobenzene dicarboxylic acid, 4,4'-stilbene dicarboxylic acid or a mixture of $C_8$-carboxylic acids.

Derivatives of carboxylic acids which will react with alcohols to form esters, for example carboxylic halides or carboxylic anhydrides, may be used instead of the carboxylic acids themselves. Esters are also suitable provided transesterification is possible under the reaction conditions.

Esterification of the compounds having the general Formula II with the acids having the Formula III or their derivatives which will react with the formation of esters may be carried out by conventional methods with or without adding solvents. When using aliphatic monocarboxylic acids it is advantageous to use an excess of acid which then serves as a solvent. When dicarboxylic acids and aromatic carboxylic acids however are used as starting materials it is advisable to carry out the reaction in an inert solvent and to use a slightly less than stoichiometric amount of carboxylic acid component. Examples of inert solvents are benzene, toluene, nitrobenzene or dimethyl formamide.

When using carboxylic acids it is advantageous to add catalysts, such as sulfuric acid or arylsulfonic acids, in order to increase the rate of esterification.

In reactions with carboxylic halides and anhydrides it is recommended that compounds such as pyridine, dimethylformamide, N-methylpyrrolidone or triethylamine, and alkali metal and alkaline earth metal hydroxides, oxides or carbonates be added. The reaction of carboxylic esters is promoted by adding acid catalysts, such as sulfuric acid, hydrochloric acid, zinc chloride or other Lewis acids, but particularly basic catalysts, for example alkali metal and alkaline earth metal hydroxides, carbonates or alcoholates, aluminum alcoholates or titanium alcoholates.

The new dyes are eminently suitable as disperse dyes for synthetic and semisynthetic textile fibers, such as acetate silk, triacetate, polyester and polyamide fibers. Particularly on polyamides and polyesters they yield bright greenish yellow to yellow dyeings having good fastness. Dyes having dicarboxylic acid components give dyeings on polyesters by the high temperature method which are particularly fast to heat setting. When suitable esterification components are chosen, for example when long chain and branched aliphatic monocarboxylic acids are used, dyes may be prepared which are suitable for coloring petrol, mixtures of hydrocarbons, inks and lacquers. Pigments having good resistance to solvents are obtained for example with aromatic dicarboxylic acid components and compounds having the Formula II which have halogen, sulfonamide or carboxylic amide substituents.

The invention is further illustrated by the following examples. The parts and percentages are by weight unless otherwise stated. Parts by volume bear the same relation to parts by weight as the liter (STP) to the kilogram.

EXAMPLE 1

A solution of 40 parts of N-(4,5-dichloro-2-nitrophenyl)-β-aminoethyl alcohol and 0.1 part of titanium tetra-n-butylate in 250 parts of butyl acrylate is boiled under reflux, the cooling being regulated so that the butanol formed during the reaction distils off through a packed column. Heating is continued until the boiling point of pure butyl acrylate has been set up. The reaction solution is then filtered while hot and cooled. The dye having the formula:

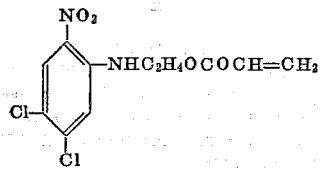

which separates in crystalline form is suction filtered and dried. It dyes acetate silk, triacetate, polyamide and polyester bright yellow shades having good fastness. The following table gives further examples of dyes which may be prepared according to the invention; they are obtained analogously to Example 1.

| Example No. | Compound according to formula (II) | Carboxylic-acid component |
|---|---|---|
| 2 | N-(2-nitrophenyl)-β-aminoethylalcohol | Butyl acrylate. |
| 3 | N-(4-methyl-2-nitrophenyl)-β-aminoethyl alcohol | Do. |
| 4 | N-(4-chloro-2-nitrophenyl)-β-aminoethyl alcohol | Do. |
| 5 | N-(5-chloro-2-nitrophenyl)-β-aminoethyl alcohol | Methyl acrylate. |
| 6 | N-(4-cyano-2-nitrophenyl)-β-aminoethyl alcohol | Butyl acrylate. |
| 7 | N-(2-nitrophenyl)-γ-aminopropyl alcohol | Do. |

EXAMPLE 8

A solution of 75 parts of N-(2-nitrophenyl)-β-aminoethyl alcohol, 1 part of titanium tetra-n-butylate and 35 parts of dimethyl terephthalate in 400 parts of toluene is boiling under reflux for four hours, the cooling being regulated so that the methanol formed during the reaction distils off through a packed column. The product is filtered while hot and cooled. The dye having the formula:

$$\underset{H}{\overset{NO_2}{\bigcirc}}-N-C_2H_4OOC-\bigcirc-COOC_2H_4-\underset{H}{N}-\bigcirc^{NO_2}$$

which is deposited in crystalline form is suction filtered and dried.

Bright greenish yellow dyeings having good fastness, in particular excellent fastness to heat setting, are obtained therewith on acetate silk, polyester and polyamide textile material.

The following table gives further examples of dyes prepared analogously to Example 2 by reaction of the components specified. The dyes give yellow to greenish yellow dyeings having good general fastness and usually outstanding fastness to heat setting on polyester and polyamide fibres and on acetate silk and triacetate.

| Example No. | Compound according to formula (II) | Carboxylic acid component |
|---|---|---|
| 9 | N-(4-methyl-2-nitrophenyl)-β-aminoethyl alcohol | Dimethyl terephthalate. |
| 10 | N-(4-cyano-2-nitrophenyl)-β-aminoethyl alcohol | Do. |
| 11 | N-(4-methyl-2-nitrophenyl)-β-aminoethyl alcohol | Diethyl succinate. |
| 12 | N-(2-nitrophenyl)-β-aminoethyl alcohol | Dimethyl succinate. |
| 13 | N-(4-cyano-2-nitrophenyl)-β-aminoethyl alcohol | Diethyl succinate. |
| 14 | N-(4-chloro-2-nitrophenyl)-β-aminoethyl alcohol | Do. |
| 15 | N-(5-chloro-2-nitrophenyl)-β-aminoethyl alcohol | Do. |
| 16 | N-(4,5-dichloro-2-nitrophenyl)-β-aminoethyl alcohol | Do. |
| 17 | N-(2-nitrophenyl)-γ-aminopropyl alcohol | Do. |
| 18 | do | Dimethyl terephthalate. |
| 19 | N-(4-chloro-2-nitrophenyl)-γ-aminopropyl alcohol | Do. |
| 20 | do | Diethyl succinate. |
| 21 | N-(4,5-dichloro-2-nitrophenyl)-γ-aminopropyl alcohol | Do. |
| 22 | do | Dimethyl terephthalate. |
| 23 | N-(2-nitrophenyl)-β-aminoethyl alcohol | Ethyl chloroacetate. |
| 24 | do | Methyl phenoxyacetate. |
| 25 | do | Methyl methoxypropionate. |
| 26 | do | Methyl ethylhexanoate. |
| 27 | do | Ethyl acetoacetate. |
| 28 | do | Methyl 2,3-hydroxynaphthoate. |

EXAMPLE 29

Water is removed by azeotropic distillation from a solution of 17 parts of N-(4-chloro-2-nitrophenyl)-β-aminoethyl alcohol in 200 parts by volume of toluene and then 1 part of pyridine is added followed in the course of one hour by a solution of 7.8 parts of terephthalyl dichloride in 50 parts of toluene. The whole is boiled under reflux for three hours until the end of the evolution of HCl. The product is then cooled and the dye having the formula:

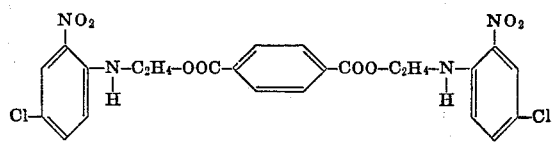

separates in crystalline form; it is suction filtered, washed with toluene, squeezed out and dried.

Brownish yellow dyeings having good general fastness properties and excellent fastness to heat setting are obtained therewith on acetate silk, polyamide or polyester textile material.

The following tables gives further examples of dyes obtained analogously to Example 29 by reaction of the said components.

and dyed for ninety minutes at this temperature. The cloth is then reductively purified in a liquor of 5 parts of 32% caustic soda solution, 2.5 parts of sodium hydrogen sulfite and 0.5 part of an adduct of 12 moles of ethylene oxide to 1 mole of oleylamine in 1000 parts of water for fifteen minutes at 75° C., rinsed and dried.

(b) 0.2 part of the dye of Example 31 is dispersed as under (a) in a dye liquor of 2.5 parts of 30% acetic and 1 part of the sodium salt of the acid sulfuric acid ester of an adduct of 80 moles of ethylene oxide to stearyl alcohol in 500 parts of water. 20 parts of polyester fibers are introduced at 20° C. and dyed for sixty minutes at 135° C. The fibers are then worked up further as described under (a).

The greenish yellow to reddish yellow dyeings thus obtained are fast to light, washing, water, abrasion and heat setting.

EXAMPLE 43

A solution of 22 parts of β-N-(4-chloro-2-nitrophenyl)-aminoethyl alcohol, 3 parts of p-toluenesulfonic acid and 0.02 part of hydroquinone in 60 parts of toluene is boiled under reflux. While boiling, 8.6 parts of acrylic acid is added within two hours. The water formed in the esterification is distilled off azeotropically and separated. Three to five hours later, the elimination of water ceases. The reaction mixture is filtered while hot and cooled. After standing for about five hours, the dye is suction filtered, washed with toluene and dried. The dye is identical with that from Example 4.

| Example No. | Compound according to formula (II) | Carboxlic acid component |
|---|---|---|
| 30 | N-(4-methyl-2-nitrophenyl)-β-aminoethyl alcohol | Terephthalyl chloride. |
| 31 | N-(2-nitrophenyl)-β-aminoethyl alcohol | Do. |
| 32 | N-(5-chloro-2-nitrophenyl)-β-aminoethyl alcohol | Do. |
| 33 | N-(4,5-dichloro-2-nitrophenyl)-β-aminoethyl alcohol | Do. |
| 34 | N-(4-dimethylamidosulfonyl-2-nitrophenyl)-β-aminoethyl alcohol | Do. |
| 35 | N-(2-nitrophenyl)-γ-aminopropyl alcohol | Do. |
| 36 | N-(4,5-dichloro-2-nitrophenyl)-β-aminoethyl alcohol | Isophthalyl chloride. |
| 37 | N-(2-nitrophenyl)-β-aminoethyl alcohol | Cinnamyl chloride. |
| 38 | do | Benzoyl chloride. |
| 39 | do | p-Methoxybenzoyl chloride. |
| 40 | do | Azobenzene-4,4'-dicarboxylic chloride. |

The dyes of Examples 27 to 29 are sparingly soluble and separate in crystalline form at boiling temperature. They are isolated by suction filtration from the hot solution and are suitable as pigments.

EXAMPLE 41

20 parts of N-(2-nitrophenyl)-β-aminoethyl alcohol in 70 parts of glacial acetic acid is boiled under reflux for three hours. After cooling, the dye having the formula:

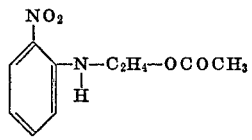

separates out in crystalline form. It is suction filtered and dried and gives bright greenish yellow dyeings on textile material of acetate silk, polyesters and polyamides.

EXAMPLE 42

(a) 0.2 part of the dye of Example 16 is dispersed in a dye liquor of 2 parts of trichlorobenzene, 30 parts of 30% acetic acid and 10 parts of the sodium salt of the acid sulfuric acid ester of an adduct of 80 moles of ethylene oxide to stearyl alcohol in 1000 parts of water by stirring in a solution of 0.2 part of the dye in 1 to 5 parts of dimethylformamide or N-methylpyrrolidone. Then at 60° C., 20 parts of polyester cloth is introduced, heated to 100° C. within fifty minutes with mechanical stirring

We claim:
1. A dye having the formula

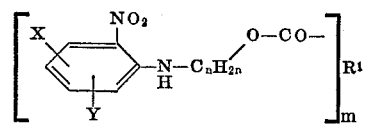

wherein

X and Y each denotes a member selected from the class consisting of hydrogen, chlorine, bromine, alkyl of 1 to 4 carbon atoms, alkoxy of 1 to 2 carbon atoms, acetylamino, cyano, sulfonamide, carbonamide, N-methyl substituted sulfonamide, N-ethyl substituted sulfonamide, N-methylsubstituted carbonamide and N-ethyl substituted carbonamide, $m$ denotes the integer 1, $n$ denotes one of the integers 1 to 6, and $R^1$ denotes the residue of a carboxylic acid selected from the class consisting of acetic acid, propionic acid, butyric acid, isobutyric acid, n-valeric acid, iso-valeric acid, chloroacetic acid, β-chloropropionic acid, β-methoxypropionic acid, acrylic acid and methacrylic acid.

2. The dyestuff having the formula:
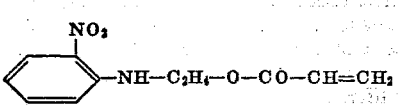
References Cited
UNITED STATES PATENTS
2,351,133  6/1944  Knight _____ 260—486 X
3,332,998  7/1967  Lambie et al. _____ 260—490
FOREIGN PATENTS
6413809  5/1965  Netherlands _____ 260—486
JAMES A. PATTEN, Primary Examiner
P. J. KILLOS, Assistant Examiner
U.S. Cl. X.R.
260—486 H, 487, 490, 556 AR, 558 R, 558 A, 573, 207.1, 410.5, 465 D, 465 E, 469, 471 R, 473 F, 473 G, 473 R, 474, 475 R, 475 FR, 476 R, 484 R, 485 H, 485 J; 8—3, 6, 55